(No Model.)  D. W. RIORDAN.  2 Sheets—Sheet 2.
CAR WHEEL AND AXLE.
No. 301,161.  Patented July 1, 1884.
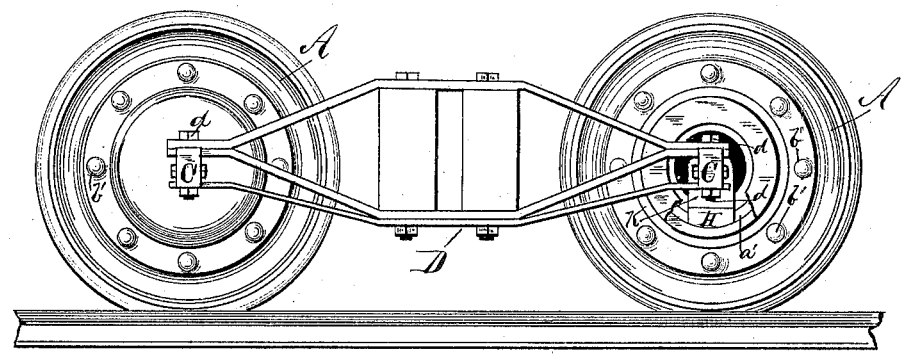
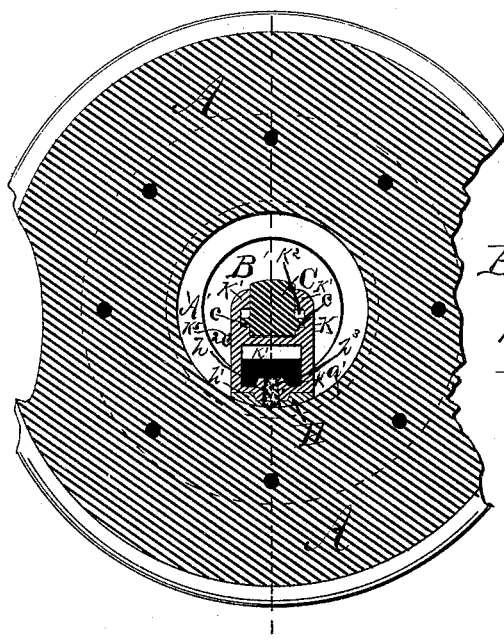 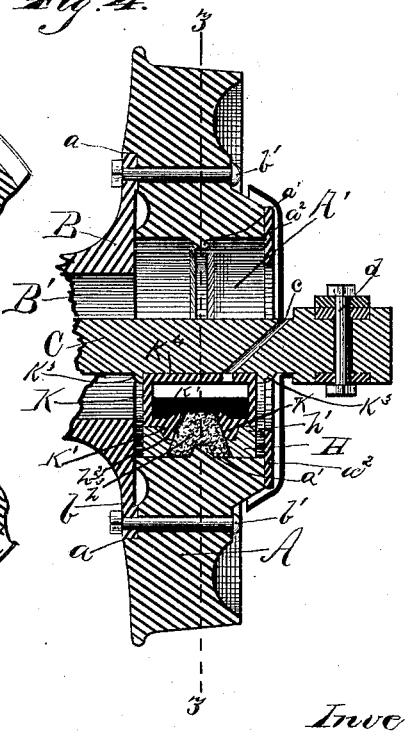
Witnesses:  Inventor:
Dennis William Riordan
Per Munday, Evarts & Adcock
his Attorneys.

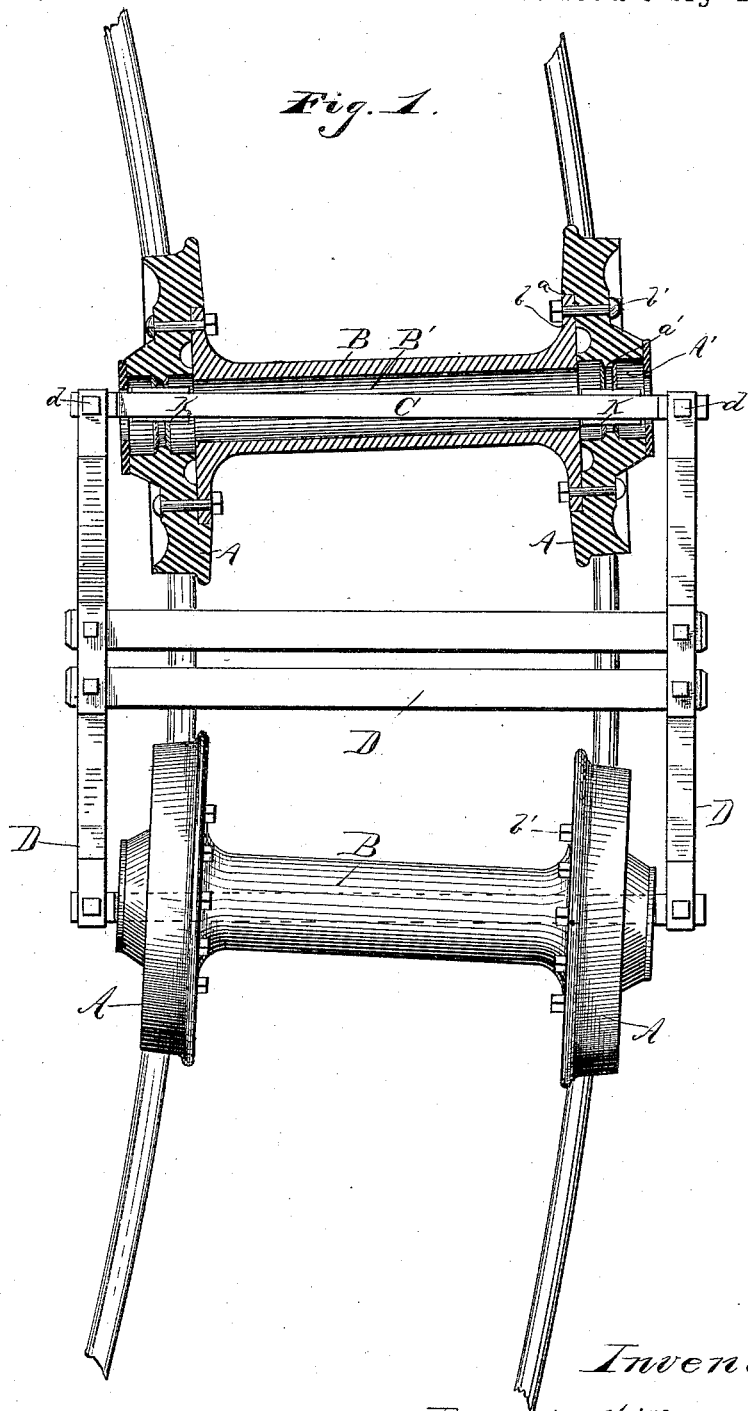

United States Patent Office.

DENNIS W. RIORDAN, OF CHICAGO, ILLINOIS.

CAR WHEEL AND AXLE.

SPECIFICATION forming part of Letters Patent No. 301,161, dated July 1, 1884.

Application filed January 21, 1884. (No model.)

*To all whom it may concern:*

Be it known that I, DENNIS WILLIAM RIORDAN, a citizen of the United States, residing at Chicago, in the county of Cook and State of Illinois, have invented a new and useful Improvement in Car Wheels and Axles, of which the following is a specification.

In this invention the wheels have a large central opening or bearing, and they are connected together rigidly by a hollow axle. The hollow axle is provided with flanges on its ends, which fit in recesses in the face of the wheels. Inside this hollow axle fits loosely an axle-bar, the ends of which are secured rigidly to the truck-frame. The axle-bar is provided at each end with a bearing-block that rests in the hole or interior surface of the wheel, the wheel being provided with a circular rib and the bearing-block with a corresponding groove to hold it in place. The hole in the hollow axle and the bearings in the wheels are made large, to permit of the axle-bar and hollow axle turning at an angle to each other when the car is moving on a curved track, and thus prevent the usual binding and strain upon the truck-frame.

The invention consists, also, in chilling the center of the wheel, as well as its periphery, in order to lessen the friction and prevent wear at its bearing.

It also consists in making the bearing-block in two removable parts, recessed into each other, the upper part being removably secured to the axle-bar, and provided with an oil-cavity, while the lower part, which is the bearing-block proper, rests upon the interior surface or bearing of the wheel. This lower part, when worn, may be quickly removed and replaced by a new one.

In the accompanying drawings, which form part of this specification, and in which similar letters of reference indicate like parts, Figure 1 is a plan view of a device embodying my invention, one pair of the wheels being shown in horizontal section. Fig. 2 is a side elevation; and Figs. 3 and 4 are enlarged sectional views taken on lines 3 3 and 4 4 of said figures, respectively.

In the drawings, A represents the wheel, B the hollow axle, and C the axle-bar, connected at its ends to the truck-frame D by the bolts $d$. The hollow axle B is provided with a flange, $b$, at each end, which fits in a corresponding recess, $a$, in the wheel A. Bolts $b'$ pass through this flange $b$ and secure the hollow axle rigidly to the wheel. The axle-bar C fits loosely in the hollow axle B, and it may consist of an ordinary square or rectangular bar of iron or steel.

$A'$ is the hole or bearing in the center of the wheel. It, like the hole $B'$ in the axle B, is made large, so as to permit of the horizontal vibration or turning of the axle-bar in the hollow axle. The interior surface or bearing of the wheel is chilled, as well as its periphery, to prevent wear.

H is the bearing-block, the lower surface of which fits the interior or bearing of the wheel. The interior of the wheel is provided with a circular rib, $a'$, and the bearing-block has a corresponding groove, $h$, to hold the same in place in the wheel. The bearing-block H, it will be observed, is comparatively narrow, and occupies only a small portion of the circumference of the bearing $A'$ of the wheel, so that the bearing-block can move forward or back in the wheel. The bearing-block H is provided with an upwardly-projecting flange or rim, $h'$, which fits outside of a corresponding downwardly-projecting flange, $k$, on the upper block, K. These flanges or shoulders serve to keep the lower or bearing block in place, as well as to direct the oil from the oil-cavity $k'$ in the upper block down through the oil-opening $h^2$ in the bearing-block. The opening $h^2$ is filled with packing $h^3$, and is made wedging in shape, so as to retain the same.

The block K is secured to the axle-bar C by flanges $k'$, which fit over the longitudinal ribs $c$ on the sides of the axle-bar, said flanges being provided with grooves $k^2$ for said ribs. The axle-bar is also provided with a rib, $k^3$, on its under side, having a notch, $k^4$, therein, to hold the block K longitudinally in place on the bar C. To remove the bearing-block H, the end of the axle-bar is raised up slightly, enough to cause the flanges $h'$ and $k$ of the blocks H and K to disengage, and then the block K is slipped inward on the axle-bar, the grooves $k^2$ being made wide enough to permit the block K to drop down, so as to pass over the rib $k^3$ on the under side of the axle-bar, and the hole in the hollow axle B being large enough to admit the block K. The block K is provided with an eyelet, $k^5$, to receive a hook for the purpose of drawing the block back into place after the block H is replaced. An oil-duct, $c^2$, leads through the axle-bar into the oil-cavity. The wheel A is provided with a flange, $a^2$, on its outer side, which serves to retain the oil in the bearing, and forms, in connection with the flange of the hollow axle B, a closed box or recess in the wheel for the bearing-block. In this way the bearing-box is in the center of the wheel directly over its tread, instead of in a hub to one side of the central line, as car-wheels have heretofore been constructed. By my invention it will therefore be seen that all side or twisting strain upon the wheel or axle is prevented. When the car or truck is being propelled forward, the axle-bar and its bearing-block are moved or thrown forward of a vertical line passing through the center of the wheel, so that the weight of the car tends to turn or start the wheel, and thus causes the car to run easier.

M is a dust-guard secured to the axle-bar, and projecting over the flange $a^3$ of the wheel for the purpose of excluding dust and dirt from the bearings. The axle-bar C, being secured rigidly to the truck-frame, braces the same and renders it very strong, so that it cannot be racked or strained out of shape.

It will be also observed that in my invention the truck-frame is suspended freely, so to speak, on the wheels, as the bearing-blocks H can oscillate back and forth in the large bearings of the wheels. This free motion of the truck-frame on the wheels causes the car to ride very smoothly, and prevents the wheels communicating the jars, jolts, or vibrations occasioned by a rough track to the car or load.

I have shown and described herein what I deem to be the best means known to me of practicing my invention; but all the different features of my invention need not of course be used, though I deem it desirable so to do, and in each of the claims I herein make to the different features of my invention I do not limit myself to the subject-matter of such claim when used in connection with some other feature or device not mentioned in such claim, though such other feature be described in the specification, and shown in the drawings in connection with the subject-matter of the claims.

What I claim is—

1. The combination, with the wheels A, provided with recesses $a$, of the hollow axle B, provided with flanges $b$ at its ends integral with said axle, and rigidly secured to said wheels by bolts passing through said flanges, and an axle-bar extending through said hollow axle, substantially as specified.

2. The combination, with a pair of car-wheels, of a hollow axle rigidly secured thereto, an axle-bar inside said hollow axle, and a bearing-block secured to said axle-bar and resting in the interior bearing-surface of the wheel, said axle-bar and its bearing-block fitting loosely in said hollow axle and in the interior bearing-surface of said wheel, so that said axle-bar may oscillate in said hollow axle or incline at an angle thereto, substantially as specified.

3. The combination of the car-wheel A, provided with recess $a$, and hollow axle B, provided with flange $b$, said car-wheel A having a flange, $a^2$, integral therewith on its opposite side, thus forming an annular cavity or recess between said flanges $a^2$ and $b$ for the bearing-block and to retain the oil, substantially as specified.

4. The combination, with the car-wheel A, having large hole or bearing A', of the bearing-block H, axle-bar C, and block K, secured to said axle-bar and fitting rigidly on said block H, substantially as specified.

5. The combination, with the wheel A and axle-bar C, of the bearing-blocks H and K, provided with flanges fitting inside each other, substantially as specified.

6. The combination, with axle-bar C, provided with ribs $c$ and $c'$ and notch $c^2$, of bearing-block K, provided with flanges $k^3$, having grooves $k$ therein, substantially as specified.

7. The combination, with the truck-frame, of the axle-bars C, rigidly secured to the ends of said frame, so as to brace and strengthen the same, the wheels, and the hollow axle rigidly secured thereto and surrounding said axle-bar, substantially as specified.

8. The combination of the wheel having a large central opening or bearing, and provided with a flange, $a^3$, on one side and a flanged hollow axle on the other side, so as to form an annular recess for the bearing-block and its lubricant, with the bearing-block H and block K, provided with an oil-cavity communicating with an opening in said bearing-block H, substantially as specified.

DENNIS W. RIORDAN.

Witnesses:
 EDMUND ADCOCK,
 TAYLOR E. BROWN.